United States Patent
Honicky, Jr. et al.

(10) Patent No.: US 7,603,372 B1
(45) Date of Patent: Oct. 13, 2009

(54) MODELING FILE SYSTEM OPERATION STREAMS

(75) Inventors: Richard E. Honicky, Jr., Oakland, CA (US); Swaminathan Ramany, Sunnyvale, CA (US); Darren Sawyer, San Carlos, CA (US)

(73) Assignee: Netapp, Inc., Sunnyvale, CA (US)

( * ) Notice: Subject to any disclaimer, the term of this patent is extended or adjusted under 35 U.S.C. 154(b) by 433 days.

(21) Appl. No.: 10/976,659

(22) Filed: Oct. 29, 2004

(51) Int. Cl.
*G06F 17/00* (2006.01)

(52) U.S. Cl. .............................. 707/102; 707/1; 707/10; 707/100; 707/101; 707/104.1; 703/13; 703/21; 703/22; 706/902

(58) Field of Classification Search .................. 703/13, 703/21, 22; 707/100, 1, 10, 101, 102, 104.1; 706/902
See application file for complete search history.

(56) References Cited

U.S. PATENT DOCUMENTS

| | | | | |
|---|---|---|---|---|
| 4,817,156 A | * | 3/1989 | Bahl et al. ............... | 704/256.2 |
| 7,231,393 B1 | * | 6/2007 | Harik et al. ............... | 707/100 |
| 2001/0049595 A1 | * | 12/2001 | Plumer et al. ............... | 703/22 |
| 2002/0100025 A1 | * | 7/2002 | Buechner et al. ............. | 717/131 |
| 2004/0225627 A1 | * | 11/2004 | Botros et al. ............... | 706/16 |
| 2005/0283511 A1 | * | 12/2005 | Fan et al. .................... | 708/306 |

\* cited by examiner

*Primary Examiner*—Shahid A Alam
*Assistant Examiner*—Phong Nguyen
(74) *Attorney, Agent, or Firm*—Perkins Coie LLP (57) ABSTRACT

A method and a system for modeling file system operation streams of a computing environment. File system operations of the file system operation streams are workloads produced by the devices of the computing environment. For example, a device of the computing environment produces the workloads, which are requests for information from a storage system of the computing environment. The requests are captured and form traces. The traces are then used as input to a model of the computing environment. The model is iteratively trained by using the traces to learn the dynamic behavior of the computing environment. Specifically, the model is trained to identify sequences of file system operations that are legal. Legal sequences can then be generated in realistic workloads that simulate the workloads produced by the devices of the computing environment to a high degree of probability.

29 Claims, 9 Drawing Sheets

INITIALIZATION VECTOR

| | S0 | S1 | S2 | S3 | S4 | S5 | S6 |
|---|---|---|---|---|---|---|---|
| 1 | 1 | 0 | 0 | 0 | 0 | 0 | 0 |

TRANSITION MATRIX

|  | S0 | S1 | S2 | S3 | S4 | S5 | S6 |
|---|---|---|---|---|---|---|---|
| S0 | 0 | 1 | 0 | 0 | 0 | 0 | 0 |
| S1 | 0 | 0 | .5 | .5 | 0 | 0 | 0 |
| S2 | 0 | 1 | 0 | 0 | 0 | 0 | 0 |
| S3 | 1 | 0 | .3 | 0 | .4 | .2 | .1 |
| S4 | 0 | 0 | 1 | 0 | 0 | 0 | 0 |
| S5 | 0 | 0 | 0 | 1 | 0 | 0 | 0 |
| S6 | 0 | 0 | 0 | 0 | 0 | 0 | 1 |

MODELING FILE SYSTEM OPERATION STREAMS

BACKGROUND

Data can reside on any system of a distributed computing environment. For example, one system may request data stored on disks of another system. Such a request is performed by initiating exemplary file system operations such as "mount" and "showmount." Further, during the uptime of the distributed computing environment, one system or a group of systems can receive multiple file system operations from a single system. Alternatively, multiple file system operations originating from many systems can be directed towards one system. Unfortunately, the system receiving the multiple file system operations can have performance issues. Specifically, overall performance on the recipient system can decrease.

Sometimes, the system that has performance issues may not be optimized to respond to the multiple file system operations. Thus, to optimize the system, an examination of the performance issues can include analyzing the impact of the multiple file system operations on the various components of the system. For example, the examination may uncover that the multiple file system operations may cause a performance issue because Random Access Memory (RAM) of the system does not have a large enough capacity. Alternatively, the examination may uncover that software operating on the system may interfere with the optimum performance of the system.

Currently, the examination can be performed by replicating the original distributed computing environment with a test distributed computing environment. Typically, the test distributed computing environment is not identical to the original distributed computing environment and the examination uses recorded multiple file system operations as input to the test distributed computing environment. However, when examining the effect of the recorded multiple file system operations on system performance using the test distributed computing environment, the examination cannot realistically replicate the multiple file system operations from the original distributed computing environment beyond using the recorded multiple file system operations. A simple solution is to build a test distributed computing environment that is identical to the original distributed computing environment. However, this simple solution is cost prohibitive and not scalable, especially for global distributed computing environments.

Alternatively, simulation software can simulate the effect of the multiple file system operations on the system. For example, the recorded multiple file system operations can be the input to the simulation software to determine the performance issues. Further, the simulation software can be executed multiple times with the recorded multiple file system operations. However, using the same recorded multiple file system operations numerous times may not uncover the performance issues. For example, the recorded multiple file system operations may not have the realistic combination of multiple file system operations that cause the performance issues. A simple solution is to record sets of multiple file system operations. However, recording sets of multiple file system operations from the original distributed computing environment is time consuming.

Accordingly, without resorting to building identical test distributed computing environments or using recorded sets of multiple file system operations, what is needed is a method and system for realistically simulating multiple file system operations of a distributed computing environment.

SUMMARY

Embodiments of the present invention provide a method and a system of modeling file system operation streams. It should be appreciated that the present invention can be implemented in numerous ways, such as a process, an apparatus, a system, a device or a method on a computer readable medium. Several inventive embodiments of the present invention are described below.

An embodiment of a method of modeling a file system operation stream includes operations for obtaining a trace from a system, such that the trace includes file system operations that are used as input to a model. Another operation includes training the model, such that the training further includes determining probabilities associated with states of the model. The embodiment also includes generating a realistic workload from a trained model, such that the realistic workload represents simulated file system operations of the file system operation stream.

Another embodiment of a method of modeling requests of a computing environment includes capturing a trace from a file system operation stream. The method further includes establishing a model, wherein the model uses the trace for training.

In an embodiment of an apparatus for modeling a file system operation stream, a first device of a computing environment is capable of generating a workload. The workload includes file system operations. Further, a second device is connected to the first device for receiving the file system operations. The file system operations are captured to produce a trace for input to a model to be trained, such that the model is capable of learning sequences of the file system operations to enable the generation of a realistic workload that simulates the file system operation stream.

An embodiment of a computing environment includes a first device of the computing environment that is capable of generating a workload. The workload includes file system operations. Further, a second device is connected to the first device for receiving the file system operations. The file system operations are captured to produce a trace for input to a model to be trained such that the model is capable of learning sequences of the file system operations to enable the generation of a realistic workload that simulates the file system operation stream. The embodiment also includes a computing environment management system that is capable of using the model after training to analyze the computing environment.

Other aspects of the invention will become apparent from the following detailed description taken in conjunction with the accompanying drawings, which illustrates by way of example, the principles of the invention.

DETAILED DESCRIPTION

The following embodiments describe a method and a system for modeling file system operation streams of any computing environment. A file system operation stream is composed of at least one file system operation, such as an "open" command. Specifically, embodiments of the present invention can model file system operation streams from a transmitting system to a receiving system. Another embodiment can model file system operation streams from many transmitting systems to the receiving system. However, it should be appreciated that any device of the computing environment that receives file system operations is capable of modeling file system operation streams, as long as the device includes a model, as described below. It will be obvious, however, to one skilled in the art, that embodiments of the present invention may be practiced without some or all of these specific details. In other instances, well known process operations have not been described in detail in order not to unnecessarily obscure the embodiments of the present invention described herein.

Figure 1:
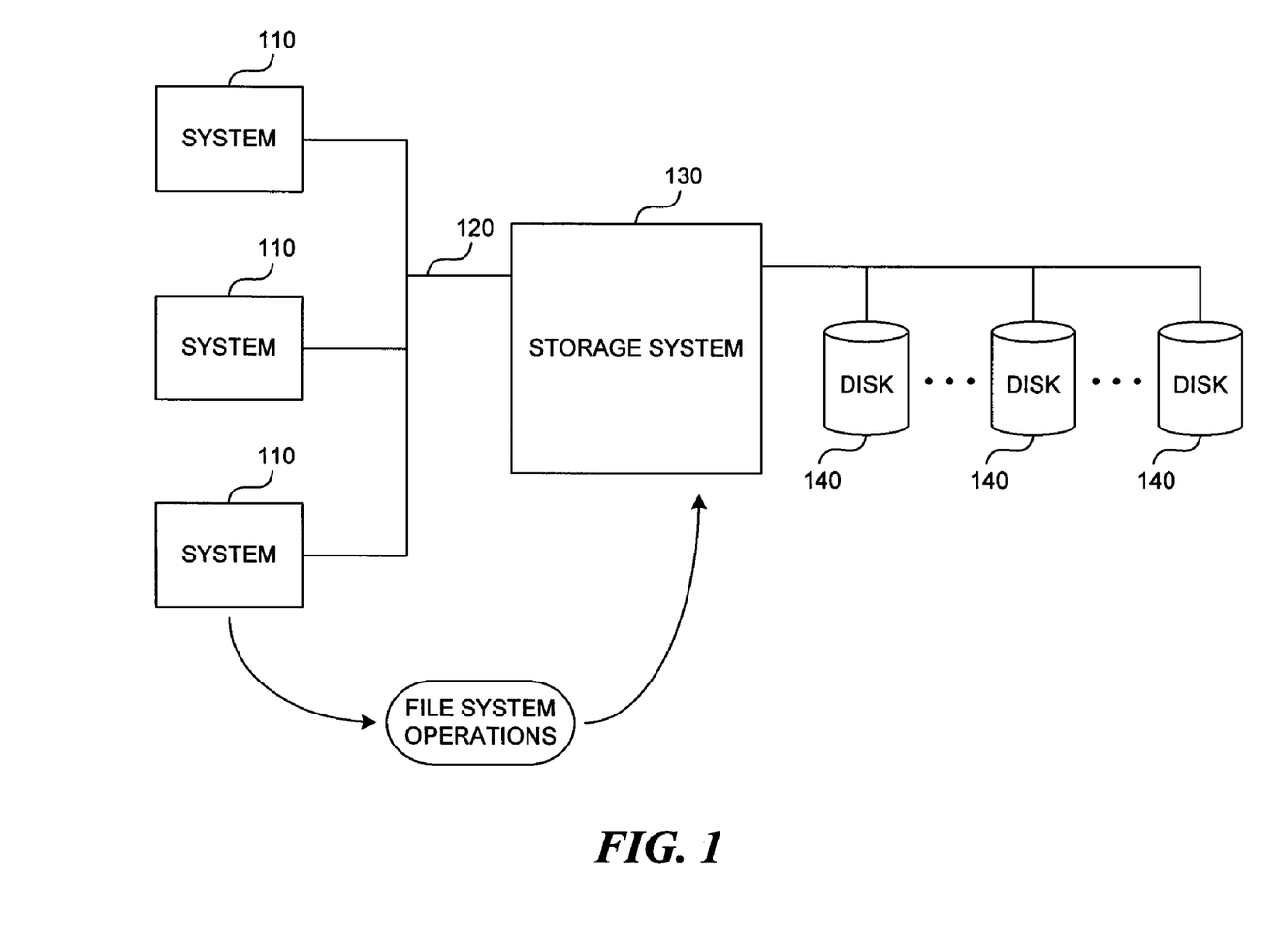
FIG. 1 is a diagram illustrating file system operations of a storage system of a computing environment, in accordance with an embodiment of the invention.

FIG. 1 is a diagram illustrating file system operations of a storage system of a computing environment, in accordance with an embodiment of the invention. For example, the computing environment can include devices such as a system 110 connected to a storage system 130. It should be appreciated that other exemplary devices of the computing environment can be any suitable computer capable of operating software. The storage system 130 is coupled to any number of disks 140. Further, the storage system 130 is a computer that provides storage services relating to the organization of information on the disks 140. The storage system 130 further includes various components (not shown), such as a processor, a memory, a network adapter, and a storage adapter that are connected together. It should be appreciated that the memory can include Random Access Memory (RAM), Non-Volatile Random Access Memory (NVRAM), and caches.

The storage system 130 is managed by a "storage operating system," such as NetApp® Data ONTAP™ operating system, which is available from Network Appliance, Inc., of Sunnyvale, Calif. The exemplary storage operating system from NetApp implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable to perform a storage function in the storage system 130, e.g., that manages data access and may, in the case of a computer, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood by those skilled in the art that the inventive technique described herein may apply to any type of special-purpose (e.g., file server, filer or multi-protocol storage appliance) or general-purpose computer, including a standalone computer or portion thereof, embodied as or including a storage system 130. An example of a multi-protocol storage appliance that may be advantageously used with the present invention is described in U.S. patent application Ser. No. 10/215,917 entitled, Multi-Protocol Storage Appliance that Provides Integrated Support for File and Block Access Protocols, filed on Aug. 9, 2002. Moreover, the teachings of this invention can be adapted to a variety of storage system architectures including, but not limited to, a network-attached storage environment, a storage area network, and disk assembly directly-attached to a client or host computer. The term "storage system" should therefore be taken broadly to include such arrangements in addition to any subsystems configured to perform a storage function and associated with other equipment or systems.

The storage operating system may implement a high-level module, such as a file system to logically organize the information stored on the disks 140 as a hierarchical structure of directories, files, and special types of files called virtual disks (hereinafter "blocks") on the disks 140. The file system, such as WAFL, cooperates with virtualization modules to "virtualize" the storage space provided by the disks 140. Further, the file system logically organizes the information as a hierarchical structure of named directories and files on the disks 140. Each "on-disk" file may be implemented as a set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

The disks 140 that store information may be any suitable writeable storage device media such as tape, optical media, magnetic media, electronic random access memory, micro-electro mechanical, and any other similar media adapted to store information, including data and parity information. The disks 140 can connect to the storage system 130 using any suitable connection method, such as a Fibre Channel (FC) serial link topology. Further, the disks 140 are logically grouped within a logical volume/file system, such that each group may be operated as a Redundant Array of Independent (or Inexpensive) Disks (RAID). Most RAID implementations, such as RAID-4 level implementation, enhance the reliability/integrity of data storage through the redundant writing of data "stripes" across a given number of disks 140 in the RAID group, and the appropriate storing of parity information with respect to the striped data. One of ordinary skill in the art will recognize that the RAID-4 level implementation is purely exemplary and that other types of RAID implementations may be used in accordance with the inventive principles described herein.

The system 110 and the storage system 130 are capable of communicating with one another through a connector 120.

The connector 120 can be a wire-based connection, such as copper, fiber optic, or other suitable media. Alternatively, the connector 120 can be a wireless connection, such as infrared, Bluetooth, or Wi-Fi. Thus, any suitable connection method between the systems 110 and the storage system 130 is possible, as long as communication is enabled between the devices of the computing environment.

Exemplary architectures enabling communication on the connector 120 include Ethernet or Fibre Channel. Each system 110 may communicate with the storage system 130 over the connector 120 by exchanging discrete frames or packets of data, according to pre-defined protocols, such as Transmission Control Protocol/Internet Protocol (TCP/IP). The system 110 may be a general-purpose computer configured to execute software applications. Moreover, the system 110 may interact with the storage system 130 in accordance with a client/server model of information delivery. That is, the system 110 may request the services of the storage system 130, and the storage system 130 may return the results of the services requested by the system 110, by exchanging packets over the connector 120. The system 110 may issue packets including file-based access protocols, such as the Common Internet File System (CIFS) protocol or Network File System (NFS) protocol, over TCP/IP when accessing information in the form of files and directories. Alternatively, the system 110 may issue packets including block-based access protocols, such as Small Computer Systems Interface (SCSI) protocol encapsulated over TCP (iSCSI) and SCSI encapsulated over Fibre Channel (FCP), when accessing information in the form of blocks.

When requesting services of the storage system 130, the system 110 may transmit file system operations over the connector 120 to the storage system 130. Exemplary file system operations may utilize a stateless protocol or a stateful protocol. Specifically, using exemplary file system operations such as open, read, write, getattr, query_path_info, and close, stateless protocols do not require that the file system operations arrive at the storage system 130 in any particular order. Exemplary stateless protocols are implemented by NFS v.1 through NFS v.3. However, the order of the file system operations is important in stateful protocols, such as NFS v.4, CIFS, and the Portable Operating System for UNIX (POSIX) file system Application Program Interface (API). For example, one of the stateful protocols may require that "open" must precede all other file system operations and "close" must be the last file system operation. It should be appreciated that the file system operations include operations for an Object Based Disk (OBD) protocol, which is a storage protocol used in an architecture similar to a Storage Area Network (SAN) architecture, a metadata server protocol, which enables a server to manage information about files in a SAN or OBD network, and a lock manager protocol such as General Parallel File System (GPFS). Thus, one of ordinary skill in the art will recognize the many file system operations exist in stateless and stateful protocols, which are contemplated by the embodiments described herein.

Figure 2:
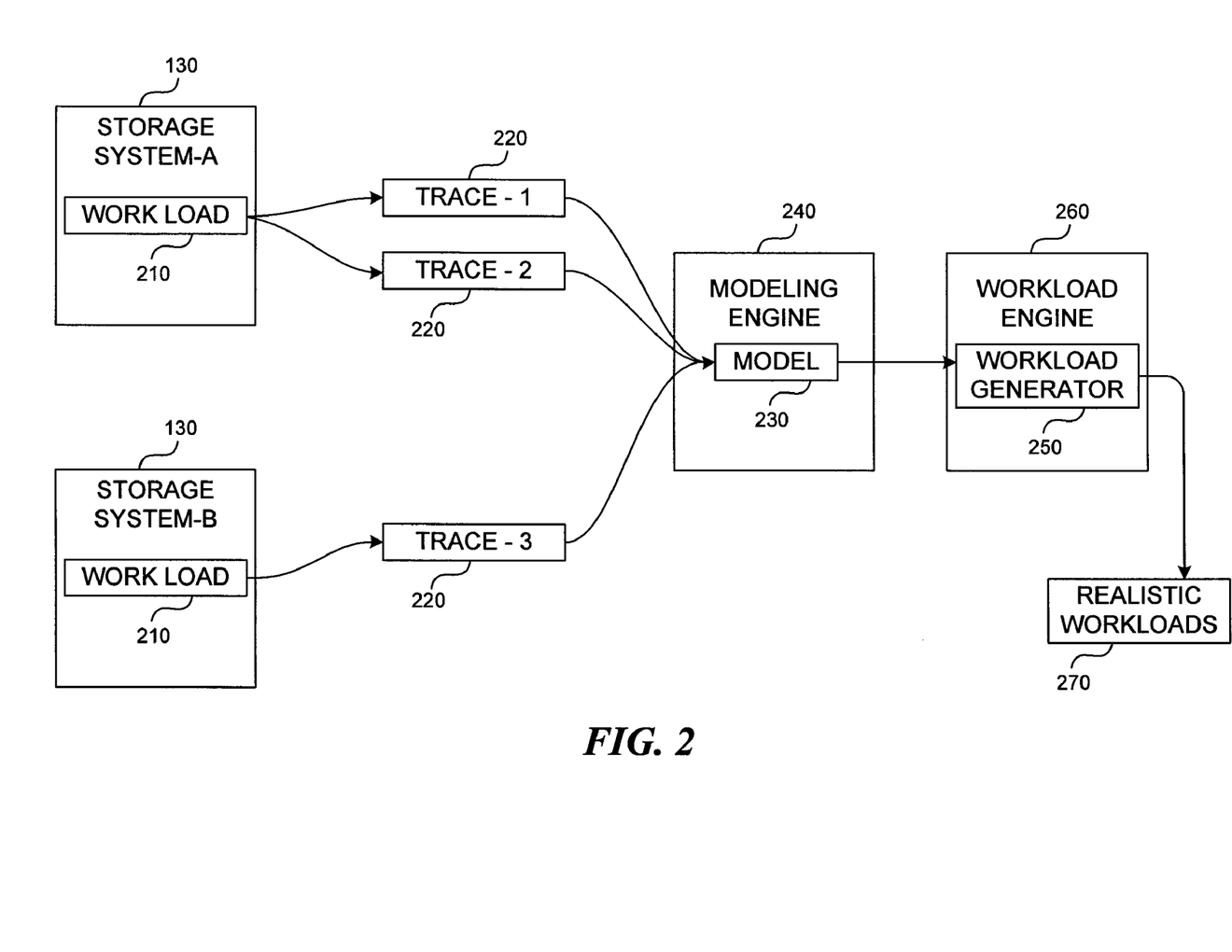
FIG. 2 is a diagram illustrating modeling file system operations, in accordance with an embodiment of the invention.

The storage system 130 is also capable of transmitting file system operations to other devices of the computing environment. For example, without showing the connector 120, FIG. 2 is a diagram illustrating modeling file system operations, in accordance with an embodiment of the invention. Specifically, the storage system-A can generate a workload 210 of traces 220, such as trace-1 and trace-2. The workload 210 is the file system operation stream that includes file system operations. The workload 210 can be recorded to produce at least one trace 220. In the exemplary illustration of FIG. 2, the trace-1 and the trace-2 are two different recordings from the workload 210 of the storage system-A. Correspondingly, a storage system-B can generate the workload 210, which can be recorded to produce trace-3. The storage system-A and the storage system-B may generate similar sets of file system operation streams by using the same protocol, but it is possible that the file system operations streams can vary. For example, the storage system-A may operate with CIFS while the storage system-B may operate with NFS v.4. It should be appreciated that the storage system 130 can also be the system 110, or any other device of the computing environment, as long as the device can generate a file system operation stream.

The workload 210 consists of file system operation streams of stateless and stateful protocols. Thus, after recording the workloads 210, the resulting traces 220 can include file systems operations of a stateless protocol or file system operation of a stateful protocol. The traces, such as trace-1, trace-2, and trace-3 are input to a modeling engine 240. The modeling engine 240 includes a model 230, which is used by a workload engine 260 having a workload generator 250 to generate realistic workloads 270. The modeling engine 240 and the workload engine 260 can be software operating on one device of the computing environment or be separate software operating on two different devices. Further, the modeling engine 240 and the workload engine 260 can also be embedded software operating on specialized processors of the devices. Thus, one of ordinary skill in the art will appreciate that the modeling engine 240 and the workload engine 260 can operate on any sized device. Such exemplary devices include portable devices such as mobile phones and Personal Digital Assistants (PDA), and non-portable devices, such as the storage system 130 (FIG. 1).

In one exemplary embodiment, the modeling engine 240 includes the model 230 that is a Hidden Markov Model (HMM), which receives the traces 220 as input. HMMs are a class of temporal inference algorithms that can be trained to learn the dynamic behavior of a system. Specifically, the exemplary model is capable of learning sequences of the file system operations captured from the workload 210. The system as defined herein is the computing environment previously described. HMMs are well known to those of ordinary skill and it should be appreciated that an embodiment of an HMM is purely exemplary. In other exemplary embodiments, the model 230 can be a Dynamic Bayesian Network or a Probabilistic State Machine. Thus, any suitable model 230 is possible, as long as the model 230 is capable of being trained and receiving traces 220 as input.

The traces 220 are input to the model 230 from any number of devices. As previously described, exemplary devices include systems 110 and storage systems 130. The traces 220 from the devices can be recorded and transmitted for input during the uptime of the computing environment, or the traces 220 can be recorded and stored until needed as input. Thus, the model 230 can be trained at any time, whether the computing environment is experiencing uptime or downtime. During training, the model 230 receives the traces 220 and iterates over each trace 220 to change probabilities associated with the model. The behavior of the model 230 will be further described in FIGS. 3 through 4E.

After training, the model 230 is available for use by the workload generator 260. Specifically, the workload generator 250 implements a pseudo-random number generator, well known to those of ordinary skill in the art, to select outputs for the realistic workloads 270. For example, if the workload 210 includes a sequence of file system operations such as "open, read, close, open, write, close, open, write, write, close," the workload generator 250 might output "open, read, close," and "open, write, write, close" as the realistic workloads 270.

Figure 3:
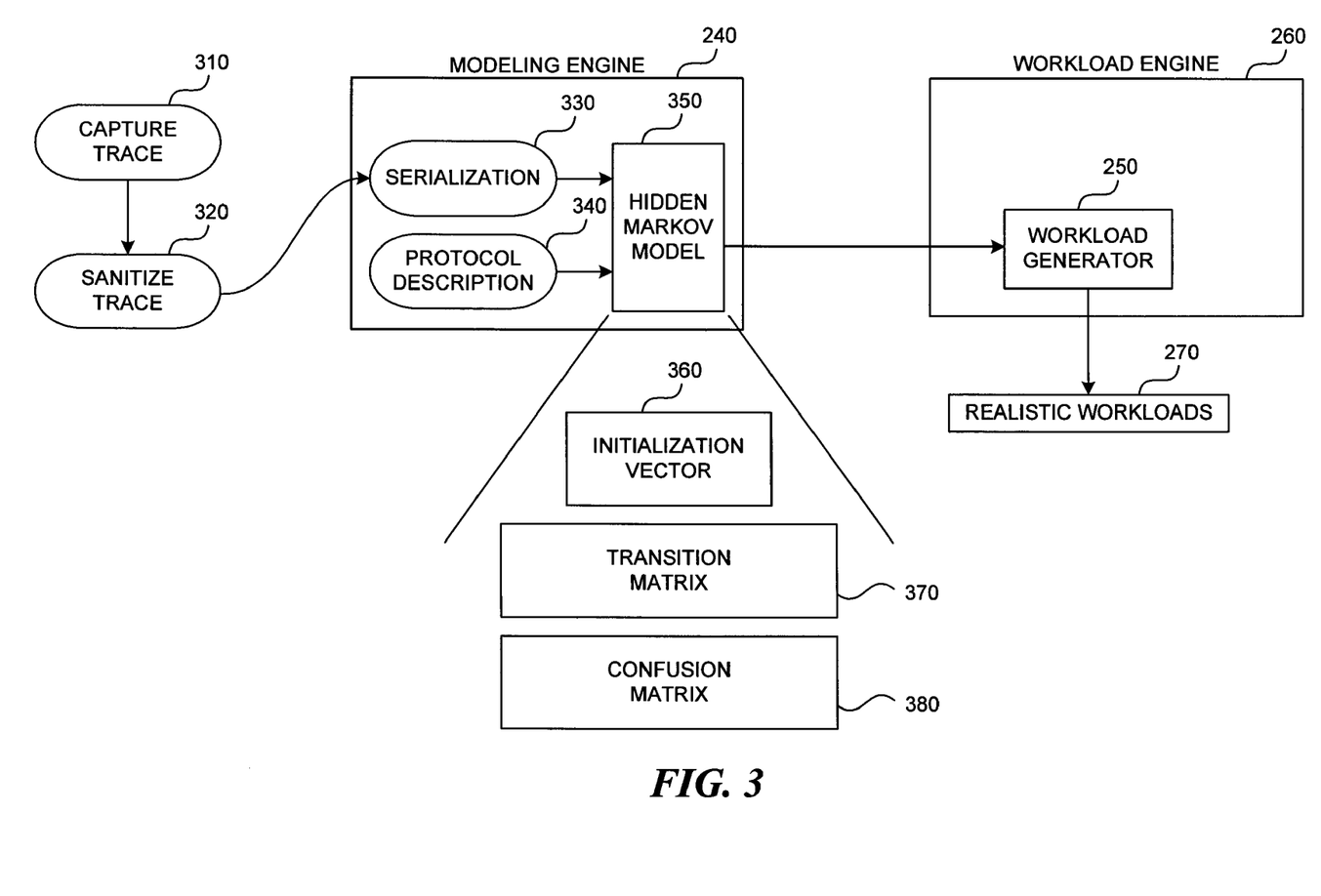
FIG. 3 is a diagram illustrating a modeling engine for modeling file system operations, in accordance with an embodiment of the invention.

FIG. 3 is a diagram illustrating a modeling engine for modeling file system operations, in accordance with an embodiment of the invention. When recording the trace 220 from the workload 210, operation 310 captures the trace 220. In an embodiment of the present invention, the recording can be performed by capturing the file system operations that are received by the storage system 130. Thereafter, operation 320 sanitizes the trace 220. Sanitizing the trace 220 includes operations such as anonymizing the trace 220 and ensuring a request/response file system operation. When anonymizing the trace 220, the operation 320 includes removing or changing information as needed and filtering unnecessary information of communication protocols not required in the trace 220. For example, a file system operation that includes time-of-day information can be filtered out if unnecessary for training the model 230.

Further, ensuring a request/response is the pairing of a file system operation, defined as a request, with the response to the request. For example, the file system operation from the system 110 can be the request "open (foo.txt)." The response can be "0x1," which is the hexadecimal address that identifies the location of the requested file "foo.txt." Thus, during sanitizing the trace 220, requests that do not have responses can be excluded from the trace 220. Of course, it should be appreciated that operation 320 is included in one embodiment of the present invention. Other embodiments need not include operation 320 and further, can replace operation 320 with other operations. Specifically, operations processing the trace 220 can vary according to the requirements for training the model 230.

The modeling engine 240 includes an operation 330 for serializing the trace 220 and a protocol description 340 of a Hidden Markov Model 350. The exemplary model 230 embodied as the HMM 350 includes an initialization vector 360, a transition matrix 370, and a confusion matrix 380. The trained HMM 350 is then used by the workload generator 250 to generate realistic workloads 270.

File system operations recorded in the trace 220 can originate from many devices of the computing environment, resulting in interleaved file system operations. Thus, operation 330 serializes the trace 220 by locating the originating device of each file system operation. By identifying the originating device of each file system operation, the file system operations can be grouped according to originating devices. Grouping the file system operations by originating devices permits the training of the model 230 with workloads 210 that are realistic. Thus, after training the model 230, the model 230 can be used to generate realistic workloads 270. Further, interleaved file system operations can be generated in the realistic workload 270 to simulate the workload 210 by using another pseudo-random generator, as later described in the Figures below.

Figure 4A:
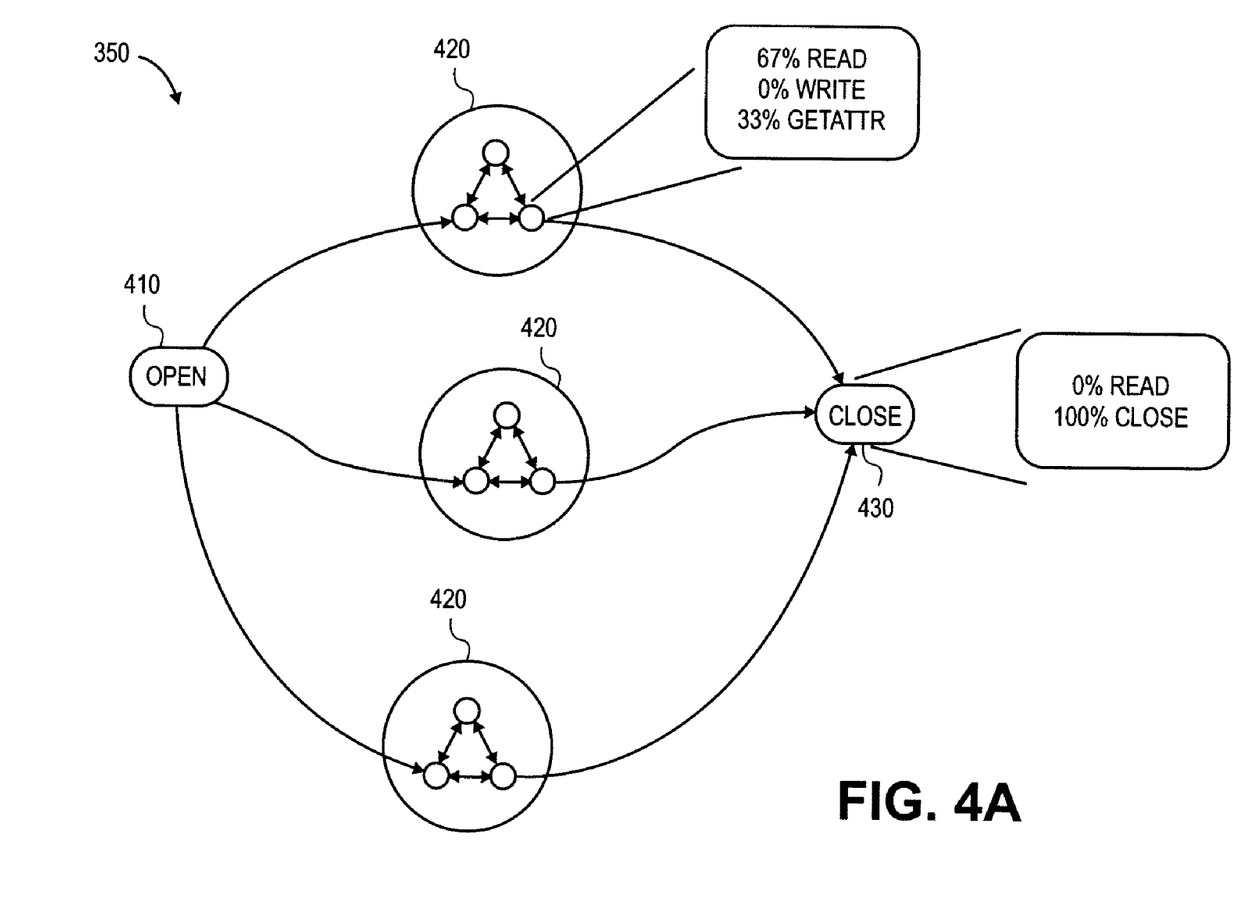
FIG. 4A is a diagram illustrating an Hidden Markov Model, which can be used to train a model 230, in accordance with an embodiment of the invention.

The protocol description 340 of the HMM 350 includes the establishment of the initialization vector 360, a transition matrix 370, and a confusion matrix 380 with probability values and mathematic algorithms for training the HMM 350. For example, the HMM 350 can be conceptualized as state transition diagram, where each state has a corresponding probability distribution representing the probability that a particular operation will be emitted into the workload when the HMM 350 is in that state. FIG. 4A is a diagram illustrating the HMM 350, which can be used to train a model 230, in accordance with an embodiment of the invention. The HMM 350 includes states, such as open 410 and close 430 and clusters 420 of states that are fully connected within the cluster 420. The states are connected by transitions, or edges. The states of the cluster 420 are assigned random probabilities such as 67% for read, 0% for write, and 33% for getattr. Further, close 430 can be assigned the probabilities of 0% for read and 100% for close. Thus, the transition to the state close 430 occurs 100% of the time when the file system operation is "close," but 0% of the time when the file system operation is "read." Accordingly, by assigning the probabilities to the states of the state transition diagram and determining the transitions between states, a portion of the protocol description 340 is established.

The probabilities initially assigned can change during the training of the HMM 350 during multiple iterations of a mathematical algorithm. Thus, each iteration of the mathematical algorithm trains the HMM 350. An exemplary mathematical algorithm used for training the HMM 350 is the Baum-Welsh Algorithm (BWA), which is a category of Expectation Maximization Algorithms, well known to those of ordinary skill in the art. For example, the BWA can operate according to the following formula:

$$P_t(\text{model/trace}) - P_{t+1}(\text{model/trace}) < \delta$$

The delta, $\delta$, defines the negligible change of the probabilities (P), over multiple iterations, defined as time (t), of the trace used to train the model 230. Specifically, after receiving the trace 220 as input, the BWA iterates over the trace 220 multiple times to change the probability values, until an end condition. The end condition, $\delta$, is when the probability values change a negligible amount. For example, a probability value may initially be assigned as 60%. After the first iteration, the probability value may change to 70%. After the second through fourth iteration, the probability value changes to 80% in decreasing amounts from 5%, 4%, and 1%, respectively. Subsequently, the fifth iteration only changes the probability value by an amount less than 1%. Thus, in this example, the change of the probability value of less than 1% after the fourth iteration is negligible and is the end condition. Of course, one of ordinary skill in the art will recognize that the probability values provided above are purely exemplary and can be any amount. Specifically, the negligible amount can be an amount greater than, equal to, or less than 1%.

As previously described, the BWA is a class of expectation maximization algorithms, which results in a probability value that is not the optimum probability value. Thus, another mathematical algorithm can be used to train the model 230 if optimum probability values are desired. In other exemplary embodiments, one or more mathematical algorithms producing various results in the probability values are possible, as long the mathematical algorithms are capable of training the model 230.

Figure 4B:
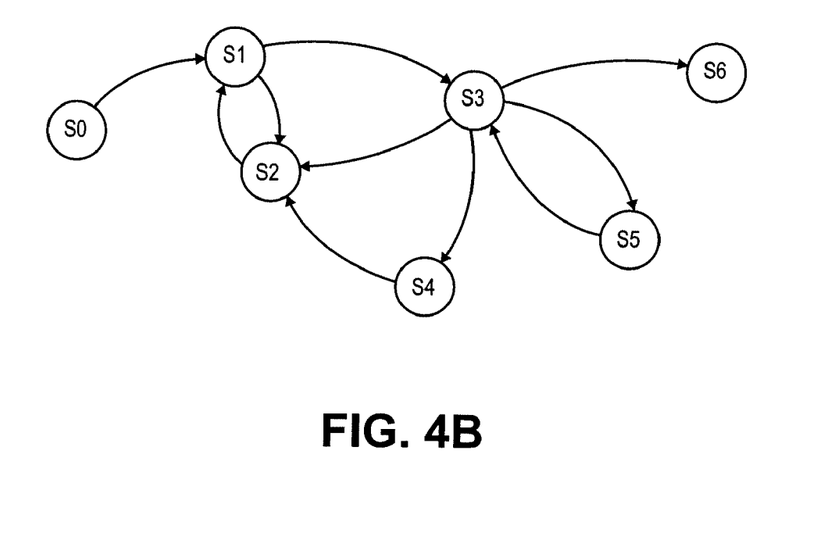
FIG. 4B is another diagram illustrating a state transition diagram for training a model, in accordance with an embodiment of the invention.
Figure 4C:
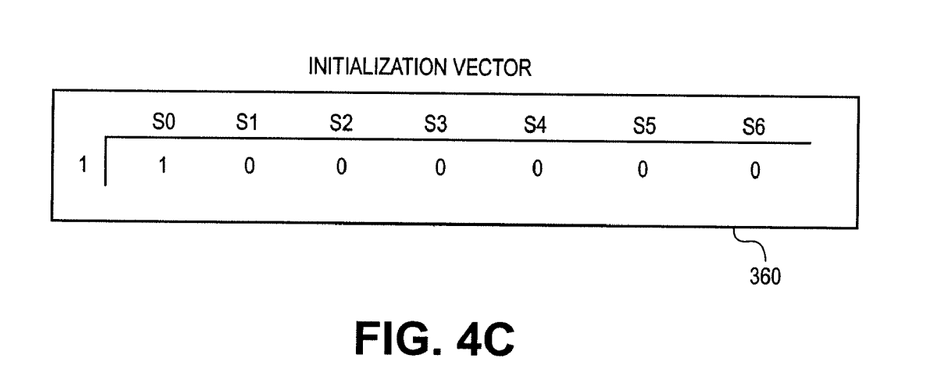
FIG. 4C is a diagram illustrating an initialization vector of a model, in accordance with an embodiment of the invention.

FIG. 4B is another diagram illustrating a state transition diagram for training the model 430, in accordance with an embodiment of the invention. Specifically, the model 430 can include six states labeled S0 through S6. Further, the exemplary transitions between the states determine legal sequences. For example, a legal sequence such as S0-S1-S2-S1-S3-S5-S3-S6 is obtained by following the transitions. However, an illegal sequence such as S0-S2-S4-S3-S5-S6 is not obtainable because the state sequences cannot results from following the transitions. It should be appreciated that any suitable state transition diagram can represent the model 430. In particular, the exemplary state transition diagram of FIG. 4B is simplified from the state transition diagram of FIG. 4A to illustrate one embodiment of the present invention. Correspondingly, FIG. 4C is a diagram illustrating the initialization vector 360 of the model 430, in accordance with an embodiment of the invention. The initialization vector 360 includes one row of probability values assigned to each state. Thus, during the protocol description 340, the probability values of each state are assigned 0% except for state S0. State S0 is assigned a 100% probability value (1) because the exemplary embodiment describes training the model 430 with a trace that always transitions from state S0 to state S1. In addition to the initialization vector 360, the transition matrix 370 is assigned probability values.

Figure 4D:
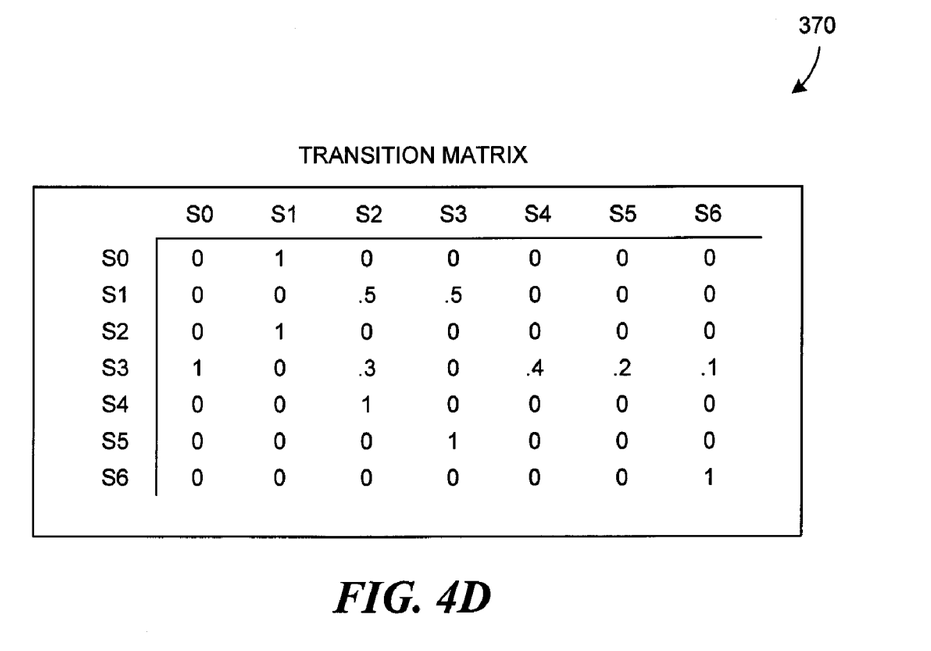
FIG. 4D is a diagram illustrating a transition matrix of a model, in accordance with an embodiment of the invention.

Specifically, FIG. 4D is a diagram illustrating the transition matrix 370 of the model 430, in accordance with an embodiment of the invention. The first row indicates the probability values of the transition from state S0 to any other state of the state transition diagram. For example, state S0 only transitions to state S1, so the probability value of that transition is 100% (1). However, because S0 cannot transition to any other state, the probability value of state S0 transitioning to any state other than state S1 is 0%. Correspondingly, the fourth row indicates the probability values of the transition from state S3 to any other state of the state transition diagram. As illustrated by FIG. 4B, state S3 transitions only to states S2, S4, S5, and S6. Thus, the probability values of state S3 transitioning to state S2 is 30% (0.3) and transitioning to state S4 is 40% (0.4). The total probability value of each row is 100%, which is determined by summing the individual probability values of each row.

Figure 4E:
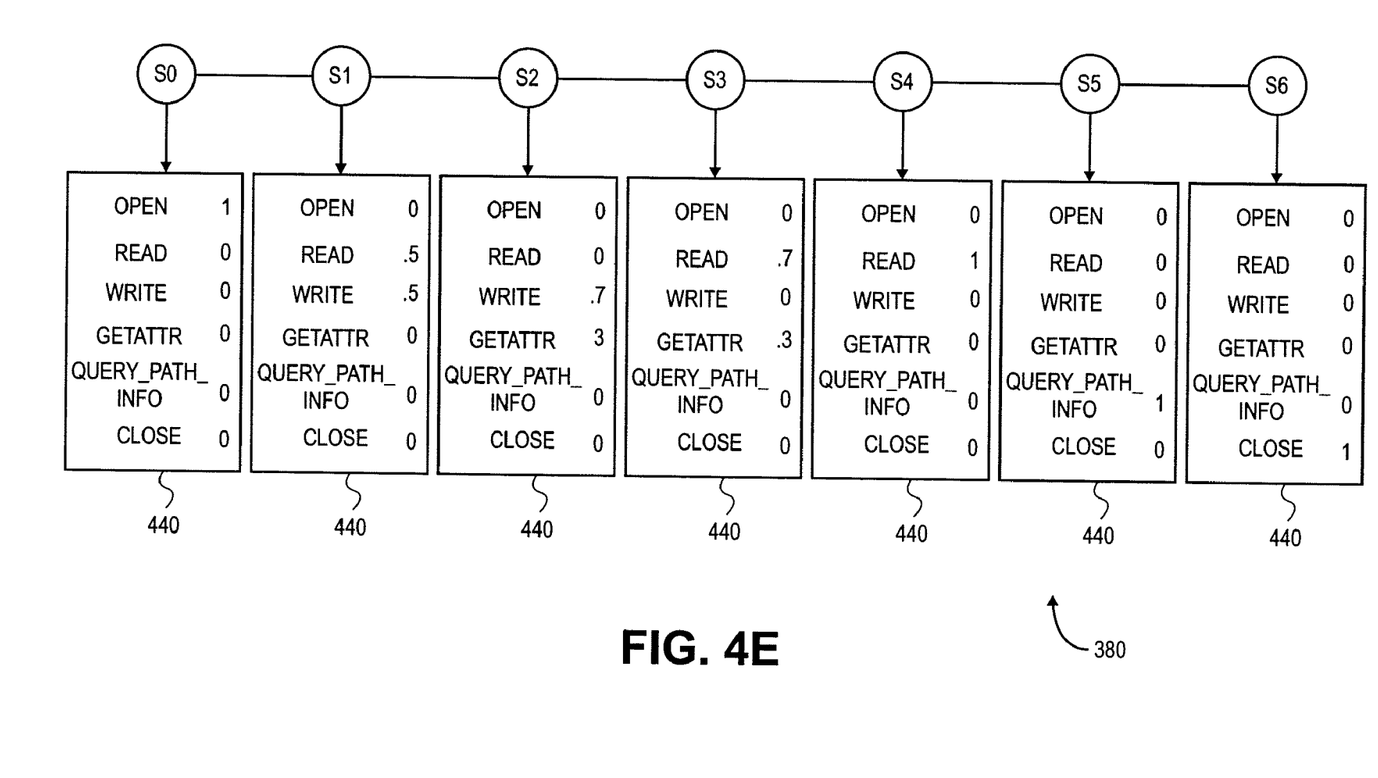
FIG. 4E is a diagram illustrating a confusion matrix of a model after training the model, in accordance with an embodiment of the invention.

FIG. 4E is a diagram illustrating the confusion matrix 380 of the model 430 after training the model 430, in accordance with an embodiment of the invention. The illustrated confusion matrix 380 includes probability values determined after training the model 430. Specifically, the probability values are determined after multiple iterations of the mathematical algorithm using the trace 220 as input to the model 430. For example, the states include the file system operations open, read, write, getattr, query_path_info, and close in an operation group 440. Each file system operation has a probability value that varies according to the state. Thus, state S0 has a probability value of 100% for open and state S2 has probability values of 70% for write and 30% for getattr. The probability values of each operation group 440 sums up to 100%.

The probability values of each operation group 440 changes according to the file system operation of the trace 220. Thus, although state S1 has probability values of 50% for read and write, the initial probability values could have each been 10% when originally assigned during the protocol description 340. While training the model 230, the probability values increase if sequenced read and write file system operations are part of the trace 220. In particular, the sequence requires that the file system operations are the second operations of a sequence of the trace 220 that begins with state S0.

Figure 5A:
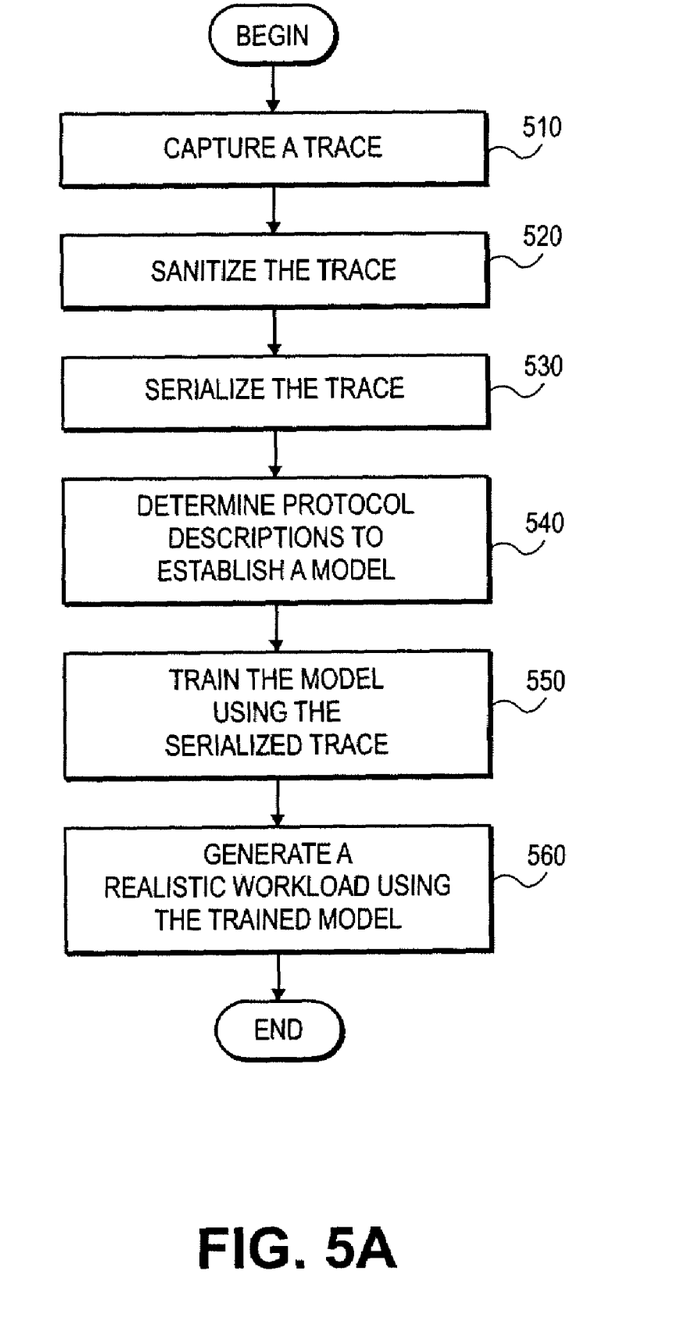
FIG. 5A is a flowchart diagram of operations for modeling file system operations, in accordance with an embodiment of the invention.

Consequently, operations for training the model 230 can be illustrated in a flowchart. FIG. 5A is a flowchart diagram of operations for modeling file system operations, in accordance with an embodiment of the invention. The operations can be performed by any device of the computing environment. Thus, in an exemplary embodiment, the operations can be performed by an operating system (OS) of the storage system. Operation 510 begins with the capture of a trace from a workload. The workload can be generated by any device of the computing environment, such as a system or another storage system. Then, in operation 520, the OS sanitizes the trace. Specifically, the sanitizing includes anonymizing the trace to filter out unnecessary information and matching requests to responses of the file system operations captured in the trace. Thereafter, in operation 530, the OS serializes the trace to identify the originating device of each file system operation. The file system operations may be interleaved with one another, so identifying the originating devices permits the grouping of file system operations that may have a sequence.

In operation 540, the OS determines protocol descriptions to establish the model. Specifically, the model can be a Hidden Markov Model, or other suitable trainable model that can use a mathematical algorithm for training. For example, a Baum-Welsh algorithm that assigns initial probabilities to an initialization vector, transition matrix, and a confusion matrix permits the training of the HMM. Regardless of the specific algorithm, the model is initialized in a way that reflects the parameters of the protocol. For example, in the case of the HMM, this means specifying legal state transitions and a best guess as to the initial probabilities in the confusion matrix. Then, in operation 550, the OS trains the model using the serialized trace. Specifically, the probabilities of the confusion matrix change after each iteration of the mathematical algorithm over the trace. Thus, the probability value of each file system operation associated with each state changes according to the appearance of the file system operation in the serialized trace. The probability values cease changing when the change is negligible. For example, if the change to the probability value is less than about 1%, then the change is negligible, and the iterations end. Then, in operation 560, the storage system that trained the model, or some other device of the computing environment, generates a realistic workload using the trained model. Thereafter, the operations end.

Figure 5B:
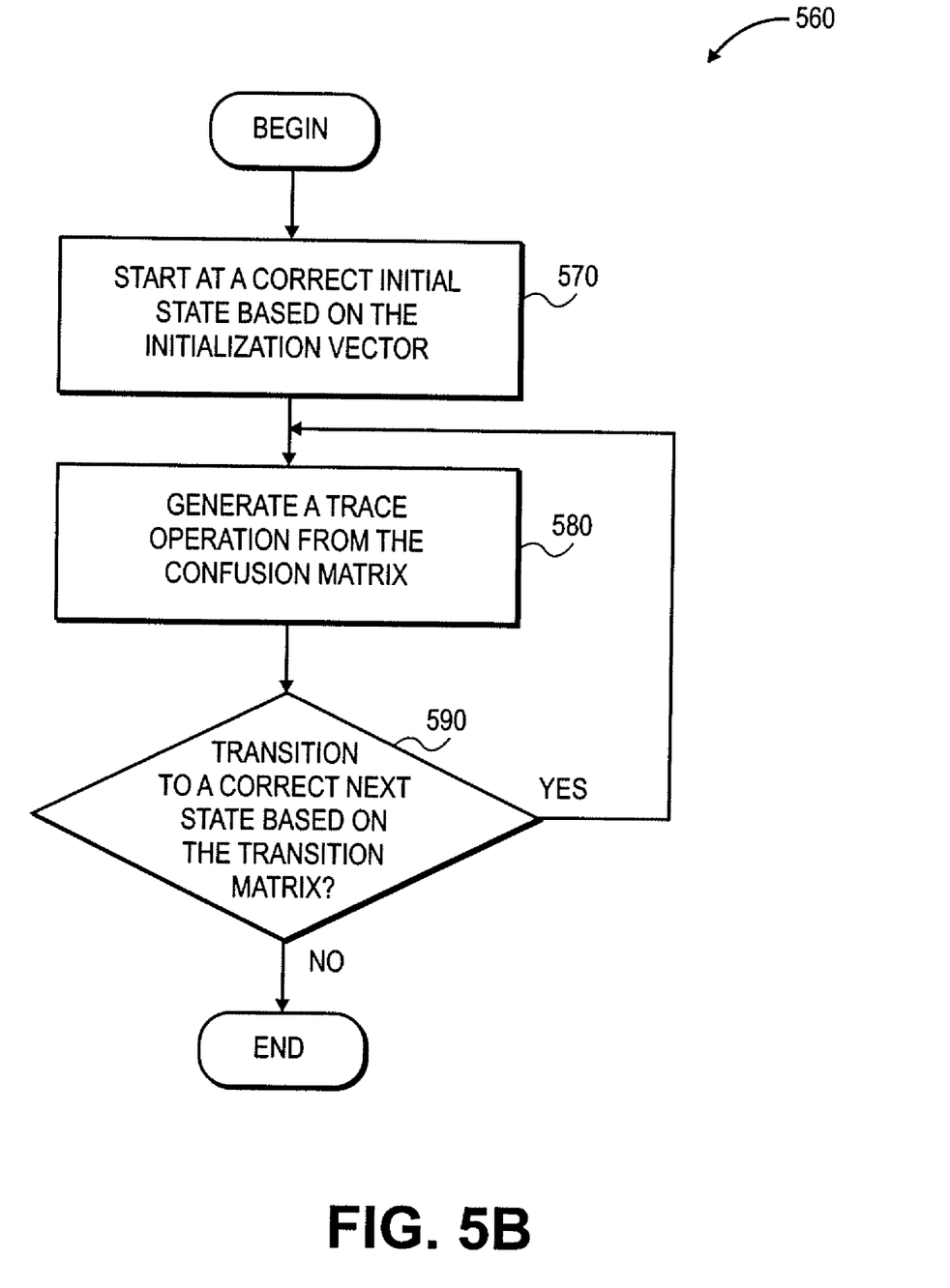
FIG. 5B is a flowchart diagram of operations for generating a realistic workload, in accordance with an embodiment of the invention.

FIG. 5B is a flowchart diagram of operations for generating a realistic workload, in accordance with an embodiment of the invention. Specifically, using the initialization vector, transition matrix, and confusion matrix of FIGS. 4C through 4E, respectively, operation 570 begins by starting at a correct initial state based on the initialization matrix. For example, the operation starts at state S0. Then, operation 580 uses a pseudo-random number generator to generate a number from zero (inclusive) to one (exclusive). Specifically, an exemplary function to generate the pseudo-random number can be "generate_random [0 . . . 1)." Consequently, operation 580 generates a trace operation from the confusion matrix. For example, the pseudo-random number generator generates "0.2," which is a number from 0 (inclusive) to 1 (exclusive). Then, the file system operation is chosen based on a close match to the generated number. For state S0, the only file system operation probability value that is a close match to the generated number is "open." Subsequently, the file system operation "open" is included in the realistic workload. It should be appreciated that other embodiments include other methods to choose file system operation probability values. For example, the file operation probability value can be chosen if the generated number is within a range of numbers. Thus, any method of choosing the file system operation for inclusion in the realistic workload is possible, as long as the generated number is used during the selection of the file system operation. Then, in operation 590, another pseudo-random number is generated and the operation transitions to a correct next state based on the transition matrix. Another pseudo-random number is then generated to choose another file system operation. This process is repeated until the desired number of file system operations has been produced.

The operations described in FIGS. 5A and 5B are purely exemplary and imply no particular order. Further, the operations can be used in any sequence and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), Storage Area Network (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in Linux® compute farms.

Embodiments of the present invention can be used for managing a computing environment. For example, a computing environment management system, such as Data Fabric Manager (DFM), developed by Network Appliance Inc., of Sunnyvale, Calif., can monitor the computing environment by using the model. Specifically, captured workloads of any device of the computing environment can train the model. The trained model is then used for analysis of the computing environment by the computing environment management system.

Further, the trained model can also be used during auto-support of the computing environment. The trained model can be automatically transmitted to a support facility for analysis. Of course, the trained model need not be automatically transmitted. It should be appreciated that the support facility can remotely access the trained model without the need for transmission. Specifically, analysis at a support facility in one geographic location can be performed by analyzing the trained model that resides on the computing environment at another geographic location.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method in a computing system of modeling a file system operation stream, comprising:
   by a processor of the computing system,
      receiving file system operations directed to a storage system;
      recording the received file system operations to produce a trace of the storage system, wherein the trace includes file system operations that are used as input to a model, the model including states defined by the file system operations, and wherein the model specifies valid state transitions between each state of the model;
      training the model to produce a trained model, wherein the training includes inputting the trace into the model and determining probabilities associated with the states of the model; and
      subsequent to training the model,
         generating a resulting workload from the trained model that is used as input to simulate dynamic behavior of the storage system, wherein the resulting workload represents file system operations; and
         simulating the file system operations of the generated workload to enable a performance analysis of the storage system.

2. The method of claim 1, wherein the file system operations are grouped according to an originating device, the originating device being capable of generating the file system operations.

3. The method of claim 1, wherein the model learns from the trace by using a mathematical algorithm that changes the probabilities associated with the states of the model.

4. The method of claim 3, wherein the probabilities associated with the states of the model are probability values that are included in a confusion matrix.

5. The method of claim 4, wherein the probability values cease changing when the change from one probability value to another probability value is a negligible amount.

6. The method of claim 5, wherein the model generates legal sequences of file system operations by using a state transition diagram.

7. A method in a computer system of modeling requests of a computing environment, comprising:
   by a processor of the computer system,
      receiving file system operations of a file system operation stream;
      producing a trace from the file system operation stream, wherein the trace is produced by recording the received file system operations of the file system operation stream;
      establishing a model capable of being trained to learn the dynamic behavior of the computing environment, wherein the model includes a plurality of states defined by file system operations, and wherein establishing the model includes defining valid state transitions between each state of the plurality of states;
      training the model to learn the dynamic behavior of the computing environment; and
      subsequent to establishing the model,
         generating a workload from the trained model and randomly generated numbers, wherein the workload is a simulated sequence of file system operations of the trace and the randomly generated numbers are used to select states and state transitions in the model, wherein the states are defined by the file system operations, and wherein the simulated sequence of file system operations is used as input to simulate dynamic behavior of the computing environment; and
         simulating the file system operations of the generated workload to analyze the performance of the computing environment.

8. The method of claim 7, wherein the file system operations are grouped according to an originating device, the originating device being capable of generating the file system operations.

9. The method of claim 7, wherein the model learns from the trace by using a mathematical algorithm that changes the probabilities associated with states of the model.

10. The method of claim 9, wherein the probabilities associated with the states of the model are probability values that are included in a confusion matrix.

11. The method of claim 10, wherein the probability values cease changing when the change from one probability value to another probability value is a negligible amount.

12. The method of claim 7, wherein the model generates legal sequences of file system operations by using a state transition diagram.

13. The method of claim 7, wherein establishing the model further comprises:
assigning probability values to initialize the model.

14. The method of claim 13, wherein the probability values are assigned to an initialization vector, a transition matrix, and a confusion matrix.

15. An apparatus for modeling a file system operation stream, comprising:
a first device of a computing environment, the first device including a first processor and a first memory accessible to the first processor, the first device to generate a workload that includes file system operations, wherein the file system operations are captured to produce a trace that includes information specifying the file system operations; and
a second device including a second processor and a second memory accessible to the second processor, the second device coupled to the first device,
wherein the second device includes a model that includes a plurality of states corresponding to file system operations and wherein the model specifies valid state transitions between each state of the plurality of states,
wherein the second device receives the trace from the first device and uses the trace to train the model, the model being capable of learning sequences of the file system operations to enable the generation of a resulting workload that is used as input to simulate dynamic behavior of the computing environment for analyzing performance of the computing environment, and
wherein, subsequent to training the model, the second device generates a workload from the trained model and uses the generated workload to simulate the computing environment.

16. The apparatus of claim 15, wherein the second device includes a modeling engine capable of training the model.

17. The apparatus of claim 16, wherein the modeling engine further includes a serialization operation capable of identifying the first device that generated the workload.

18. The apparatus of claim 16, wherein the model further includes an initialization vector, a transition matrix, and a confusion matrix.

19. The apparatus of claim 15, wherein the sequences of the file system operations are derived from a stateless protocol or a stateful protocol.

20. The apparatus of claim 19, wherein the stateless protocol requires no order among the file system operations.

21. The apparatus of claim 19, wherein the stateful protocol requires an order among the file system operations.

22. A computing system operable in a computing environment, comprising:
a first device of the computing environment, the first device including a first processor and a first memory accessible to the first processor, the first device to generate a workload that includes file system operations, wherein the file system operations are captured to produce a trace that includes information specifying the file system operations;
a second device including a second processor and a second memory accessible to the second processor, the second device coupled to the first device to receive the trace and to use the trace to train a model that includes states defined by the file system operations, the model specifying valid state transitions between the states, the model being capable of learning sequences of the file system operations to enable the generation of a resulting workload that is used as input to simulate dynamic behavior of the computing environment; and
a computing environment management system capable of using the model after training to analyze the computing environment, wherein the computing environment management system analyzes the computing environment by:
generating a workload from the trained model, the generated workload representing file system operations that are used as input to the computing environment management system to simulate the computing environment; and
simulating the file system operations of the generated workload to analyze the performance of the computing environment.

23. A method in a computer system of modeling a file system operation stream, comprising:
by a processor of the computer system,
receiving file system operations directed to a storage system;
recording the received file system operations to produce a trace of the storage system, wherein the trace includes file system operations that are used as input to a model, the model including states defined by the file system operations, wherein the model specifies valid state transitions between each states, and wherein each state has a corresponding probability distribution representing a probability that a particular file system operation will be emitted into the trace in that state;
training the model to produce a trained model, wherein the training includes determining probabilities associated with the states of the model; and
subsequent to training the model,
generating a resulting workload from the trained model that is used as input to simulate dynamic behavior of the storage system, wherein the resulting workload represents file system operations of the file system operation stream; and
simulating the file system operations of the generated workload to enable a performance analysis of the storage system.

24. The method of claim 23, wherein the file system operations are grouped according to an originating device, the originating device being capable of generating the file system operations.

25. The method of claim 23, wherein the model learns from the trace by using a mathematical algorithm that changes the probabilities associated with the states of the model.

26. The method of claim 25, wherein the probabilities associated with the states of the model are probability values that are included in a confusion matrix.

27. The method of claim 26, wherein the probability values cease changing when the change from one probability value to another probability value is a negligible amount.

28. The method of claim 27, wherein the model generates legal sequences of file system operations by using a state transition diagram.

29. A method in a computing system of modeling a file system operation stream, the method comprising:

by a processor of the computing system, receiving file system operations directed to a network storage server;

recording the received file system operations to produce a trace of the received file system operations;

establishing a model capable of being trained to learn dynamic behavior of the storage system, wherein the model includes a plurality of states defined by file system operations of the network storage server and wherein establishing the model includes specifying valid state transitions between each state of the plurality of states;

training the model to learn the dynamic behavior of the network storage server by inputting the trace of the received file system operations into the model and determining probabilities associated with each state of the model;

subsequent to training the model, generating a workload from the trained model, wherein the generated workload represents file system operations that are used as input for simulation of the network storage server; and simulating the file system operations of the generated workload on the network storage server to enable a performance analysis of the network storage server.

* * * * *